US006756541B1

(12) United States Patent
Mollick et al.

(10) Patent No.: US 6,756,541 B1
(45) Date of Patent: Jun. 29, 2004

(54) ELECTRICAL OUTLET BOX WITH MOUNTING MEANS

(76) Inventors: Mark Mollick, 3545 W. Altadena Ave., Phoenix, AZ (US) 85029-3120; Paul Mollick, 3545 W. Altadena Ave., Phoenix, AZ (US) 85029-3120

( * ) Notice: Subject to any disclaimer, the term of this patent is extended or adjusted under 35 U.S.C. 154(b) by 0 days.

(21) Appl. No.: 10/259,339

(22) Filed: Sep. 26, 2002

Related U.S. Application Data
(60) Provisional application No. 60/342,028, filed on Oct. 19, 2001.

(51) Int. Cl.[7] .................................................. H01H 9/02
(52) U.S. Cl. ............................. 174/58; 174/60; 174/64; 220/4.02; 33/528
(58) Field of Search ............................. 174/53, 57, 58, 174/60, 63, 64; 220/3.2, 3.7, 3.9, 4.02; 248/544, 906; 33/528, DIG. 10

(56) References Cited

U.S. PATENT DOCUMENTS

RE28,489 E * 7/1975 Schindler et al. ............. 174/58
4,794,207 A * 12/1988 Norberg et al. ............... 174/48
4,873,600 A * 10/1989 Vogele ...................... 174/50 X
5,744,753 A * 4/1998 Nattel ......................... 174/58
6,369,327 B1 * 4/2002 Fierro ......................... 174/58

* cited by examiner

Primary Examiner—Dhiru R Patel
(74) Attorney, Agent, or Firm—Gregory J. Nelson

(57) ABSTRACT

An electrical box defining an electrical component enclosure for a device such as a receptacle, switch or wire for establishing connections. A wall of the box has mounting members, either flush or projecting above the surface, which mounting members define a bore for a nail or screw. The mounting means is exteriorly of the enclosure to comply with applicable codes. The bores are angularly oriented so an electrical fastener may install from the front of the box requiring a cut-out only slightly larger than the dimensions of the box. A fastener guide channel may be provided to assist to align the fastener with the bore when it is recessed. Preferably the box is fabricated by molding it from plastic such as phenolic material. The box may be round, square or rectangular.

10 Claims, 6 Drawing Sheets

ELECTRICAL OUTLET BOX WITH MOUNTING MEANS

CROSS-REFERENCE TO RELATED APPLICATION

This application is based on provisional application Serial No. 60/342,028, filed Oct. 19, 2001, of the same title.

FIELD OF THE INVENTION

The present invention relates to electrical outlet boxes and more particularly relates to electrical outlet boxes having mounting members which comply with the National Electrical Code (NEC) allowing the box to be installed without the necessity of having to cut large openings when installing boxes in walls enclosed by paneling or drywall.

BACKGROUND OF THE INVENTION

A variety of electrical boxes have been developed for use in both residential and commercial construction. Electrical boxes are provided to contain or house electrical junctions, switches and receptacles. In the past, most of these boxes were formed of metal.

However, more recently, electrical boxes molded or extruded from plastic, such as phenolic resins, have been developed and are widely used due to their reduced cost and, further, because of their dielectric characteristics. While molded plastic electrical boxes have become widely accepted, certain problems exist with these boxes. One particularly problem relates to the attachment of the boxes to framing and structural members such as wall studs. Generally, boxes are molded or formed having some type of projection, or ear, that extends from the side box. Such projections serve as integral hanger elements and are provided to secure or attach the boxes to the stud or other structural member. These hangers extend outwardly from the box and include apertures or holes which allow them to be attached to the stud by a screw or nail fastener and are represented by the type of box termed "single gang with captive nails" manufactured by Carlon. However, placement of the hangers in these locations often requires that the electrician installing the box cut an opening much larger than the dimensions of the box in material, such as drywall, in order to be able to access the hanger and drive the fastener into the adjacent stud.

Another approach electricians have used when installing electrical boxes, such as molded plastic boxes, is to place fasteners or screws inside the box, extending through a wall in the box, into the adjacent stud. While this approach eliminates the need for cutting an oversize hole in the drywall, the presence of a metallic fastener within the interior of the box creates a potentially dangerous situation. It is possible that exposed conductors within the interior of the box may come into contact with the screws, thus creating an electrical short and a potential fire hazard.

Further, placement of fasteners or screws within the interior or confines of electrical outlet boxes is in violation of Article 314.43 of National Electrical Code (NEC) 2002 which states that provisions for supports or other mounting means for non-metallic boxes shall be outside of the box or the box shall be constructed so as to prevent contact between the conductors and the box and the supporting screws.

Accordingly, the present invention provides an electrical box structure that enables electricians to attach an electrical box to a wall stud or other member without having to cut a large hole in the paneling or drywall. The opening need only be cut approximately the same size as the electrical box and thereafter the box can be inserted into the cutout and attached. The present invention complies with the mandates of the NEC as metal screws or nails are not located within the interior of the box, nor in a location likely to come into contact with wires or conductors possibly creating a ground or short.

BRIEF SUMMARY OF THE INVENTION

The present invention provides an electrical box which in one embodiment may have a generally square or rectangular shape and which may be configured in any conventional size such as single gang or double gang. The box has opposite sidewalls, a top surface and bottom surface and a rear wall defining an open interior for receipt of a receptacle, switches or for wire connection using wire nuts. A fastener receiving mounting member is disposed on the top and bottom surfaces of the box adjacent one sidewall. The mounting members each define a bore for insertion of a fastener. The mounting members are spaced rearwardly from the front of the box and the bores each have an axis which extends angularly to intercept the front face of the box so the installer may easily insert and drive the fastener in place. The mounting members are integrally formed as part of the surfaces and are received. A channel may also be placed in the top and bottom surface aligned with the bore axis to assist in positioning and orienting the fasteners.

In an alternate embodiment, the mounting members are formed as projections extending from the top and bottom surfaces of the box eliminating the channel in these surfaces. The mounting members are angularly disposed and have a bore with an axis extending to the front of the box.

In an alternate embodiment, the electrical outlet box is generally round having at least one angularly disposed bore or channel extending to a flat section of the sidewall for receiving a fastener.

The box can be easily installed in a closed-in wall by cutting an access opening in the drywall or paneling. The opening is only required to be slightly larger than the dimensions of the box. This allows the box to be inserted through the opening to a position abutting a structural member such as a stud. Proper positioning is aided by small, raised projections on the sidewalls of the box. A fastener, such as a nail or screw, can then be installed from the front of the box by inserting the fastener in the bore in the mounting members. The installation is completed by securing the fasteners to the adjacent stud by driving or screwing them into the stud.

Therefore, it is an object of the present to provide an improved molded, electrical box and includes a new and improved mounting structure.

It is a further object of the present invention to provide a new and improved molded, electrical box that has a mounting structure that allows the box to be easily mounted without the necessity of cutting a large, oversize hole in wall coverings.

It is a further object of the present invention to provide an improved molded, electrical box that includes mounting structure as an integral part of the box and which is suitable for installation in an existing wall without requiring excessive cutting that may require subsequent patching.

BRIEF DESCRIPTION OF THE DRAWINGS

The above and other objects of the present invention will become more apparent from the following description, claims and drawings in which:

DETAILED DESCRIPTION OF THE DRAWINGS

Figure 1:
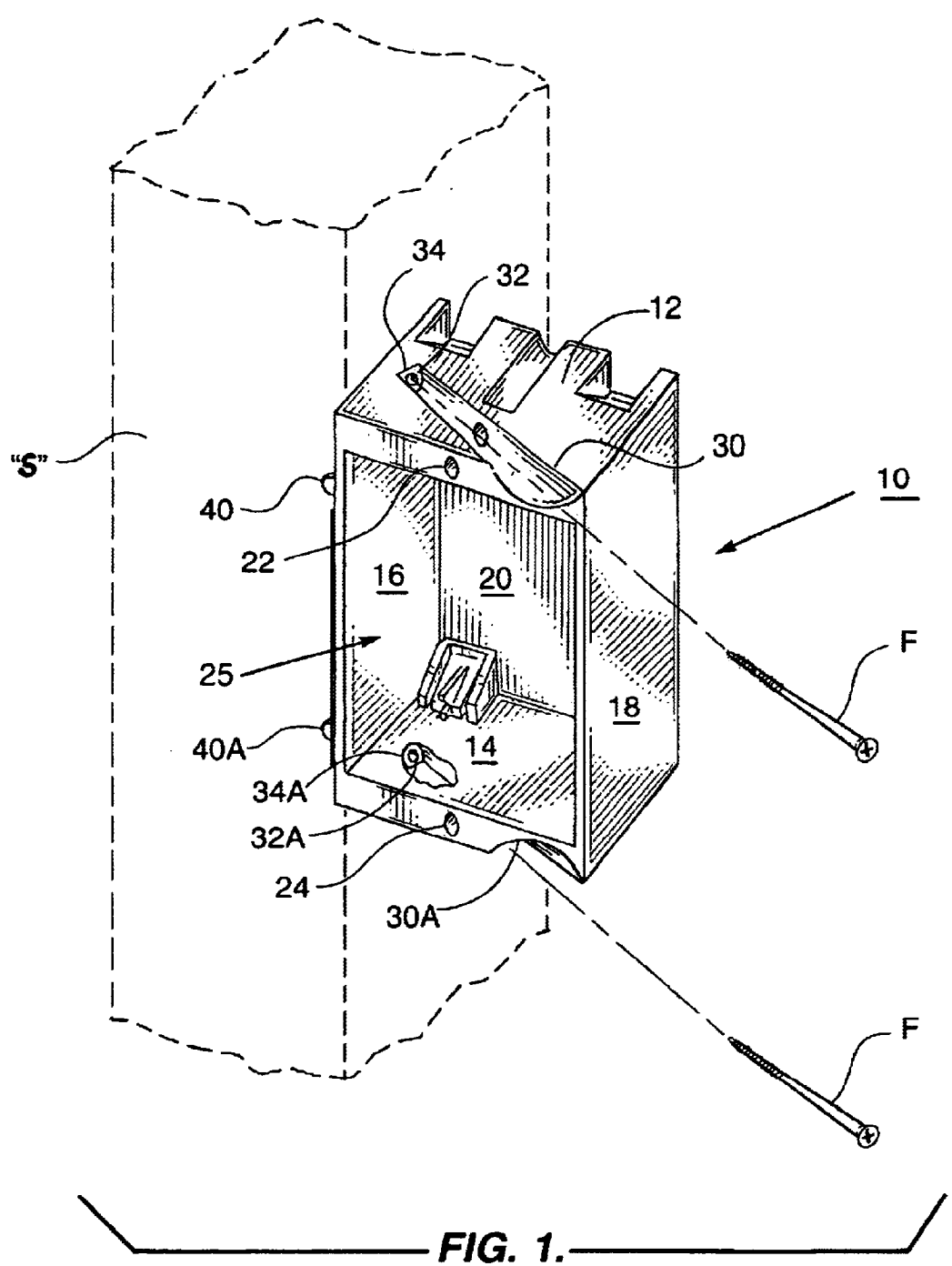
FIG. 1 is a perspective view showing an electrical box constructed in accordance with the present invention installed to an adjacent stud.

Turning now to FIG. 1, a preferred embodiment of the electrical box of the present invention is shown and is generally designated by the numeral 10. The electrical box 10 is preferably molded from a suitable plastic material such as a non-conductive phenolic resin although the box of the present invention may be fabricated from other materials such as metal.

The box may be dimensioned in any convenient, conventional size and shape such as double gang, single gang or the like. Typically, a single gang box will be rectangular and have dimensions approximately 3½" high, 3¼" deep and 2¼" wide. The electrical box 10 has a top wall 12, bottom wall 14, opposite sidewalls 16 and 18, and a rear wall 20, forming an enclosure 25 having an open front. The box may also be provided with suitable knockouts, not shown, to provide access for passage of electrical conductors.

Threaded bores 22 and 24 are provided in the top and bottom walls 12 and 14 extending from the front face of the box rearwardly. These threaded bores are adapted to receive screws which normally are used to mount an electrical switch, receptacle or other device within the box.

A semi-circular channel 30 extends in the top wall from the front face rearwardly terminating at a location spaced inwardly from sidewall 16. The channel 30 has a size and depth to accommodate conventional fasteners such as a nail or screw and preferably tapers inwardly from the front to the rear. A bore 32 extends from the end of the channel and projects through the sidewall 16 at a recessed mounting member 34 formed in the top wall. The axis of the bore 32 aligns with the center of the channel 30 as indicated by the dotted line in FIG. 1.

The bottom wall 14 is provided with a similarly configured and oriented channel 30A which also terminates at a recessed mounting member 34A inward of sidewall 16 and having a bore 32A which aligns with the channel and extends to the sidewall 16.

The sidewalls 16 and 18 may each be provided with a pair of small projections 40, 40A which are vertically spaced apart and which will assist in positioning and properly orienting the box with respect to a structural member such as vertical stud "S," which is shown in dotted lines.

Figure 3:
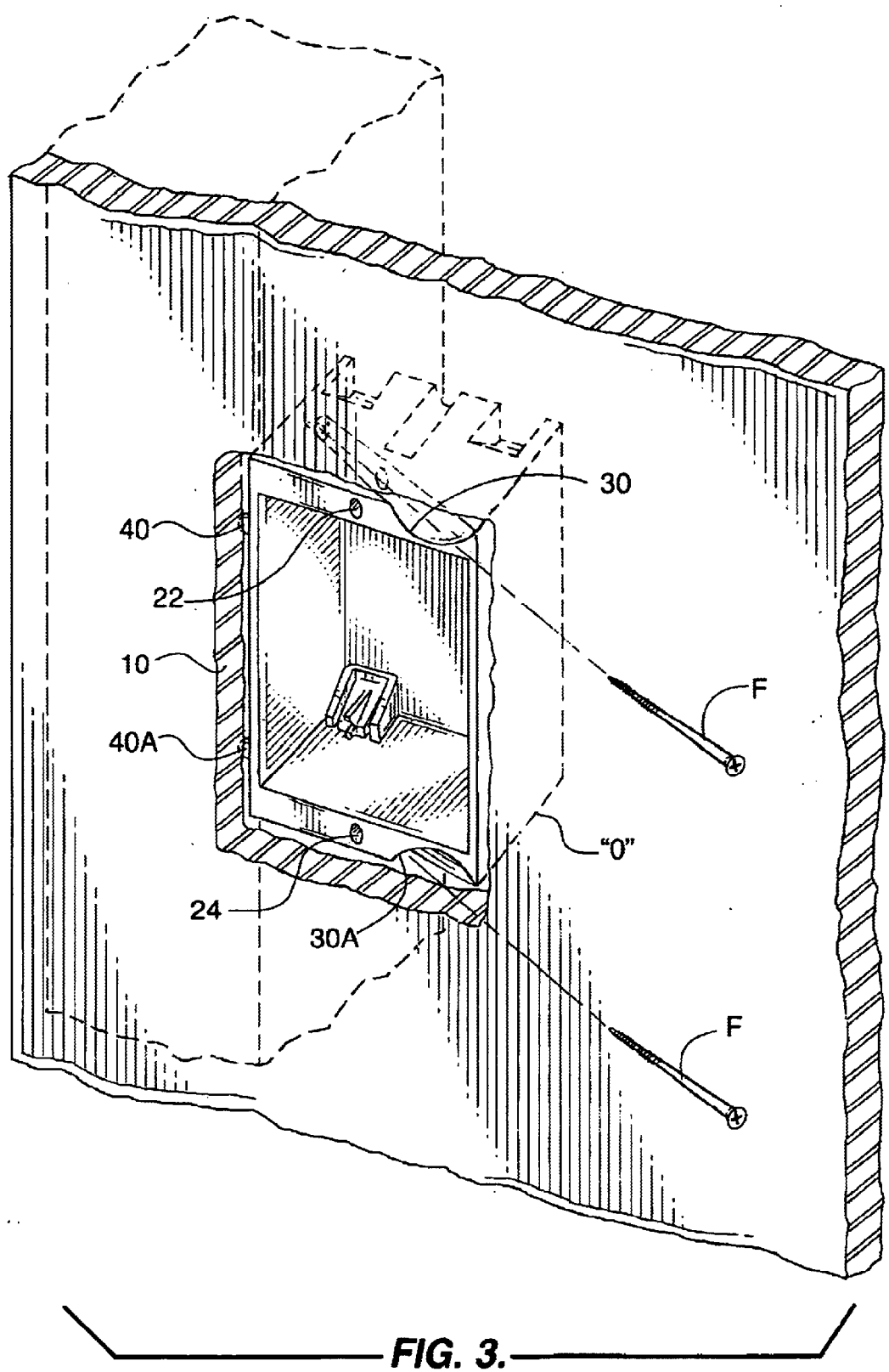
FIG. 3 illustrates the installation of the electrical box of the present invention.

When the box 10 is to be installed in an existing closed-in structure such as an interior wall which has been framed and covered with drywall, the installer will first determine the location of the box. Once this is established, an access opening "O" in the drywall is cut at this location, as seen in FIG. 3. The opening will conform to the overall shape and size of the box to be installed, be it single gang, double gang or other configuration. The opening need only be slightly larger than the height and width of the box. Once the opening has been cut, the electrical box 10 can be inserted into the opening adjacent the structural member such as the stud. The projections 40, 40A will assist to properly orient the box. The projections 40, 40A may be positioned a predetermined distance rearward of the front face of the box to accommodate the thickness of the wall covering material, such as drywall or gypsum board. With the electrical box 10 held in this position, the installer may then secure the box using fasteners "F" such as nails or wood screws, as shown. The fastener is aligned with the channel 30 in the upper surface and guided rearwardly along the channel until it enters the bore in the mounting means at the distal end of the channel. The point of the fastener will extend through the base and then contact the stud "S." The installer can then drive the fastener into the adjacent stud using a screw driver or driver head on an electric drill. The procedure is repeated by securing the bottom end of the box using another fastener inserted through channel 30A and bore 32A.

Once the installation of the box is complete, the necessary electrical connections can then be made. For example, if a receptacle is to be positioned within the box, the electrical connections can be completed and the receptacle secured by screwing the receptacle to the threaded apertures 22, 24 extending in the upper and lower walls. It will be appreciated that the procedure can be accomplished from the front of the box with the electrician working through a cutout which is approximately the same size as the width and height dimensions of the box.

After installation, a cover or other decorative or protective plate may be applied as is conventional. The cover plate will engage the wall around the periphery of the front opening of the box, extending over the edges of the cutout "O" so that no additional patching is necessary.

Figure 2:
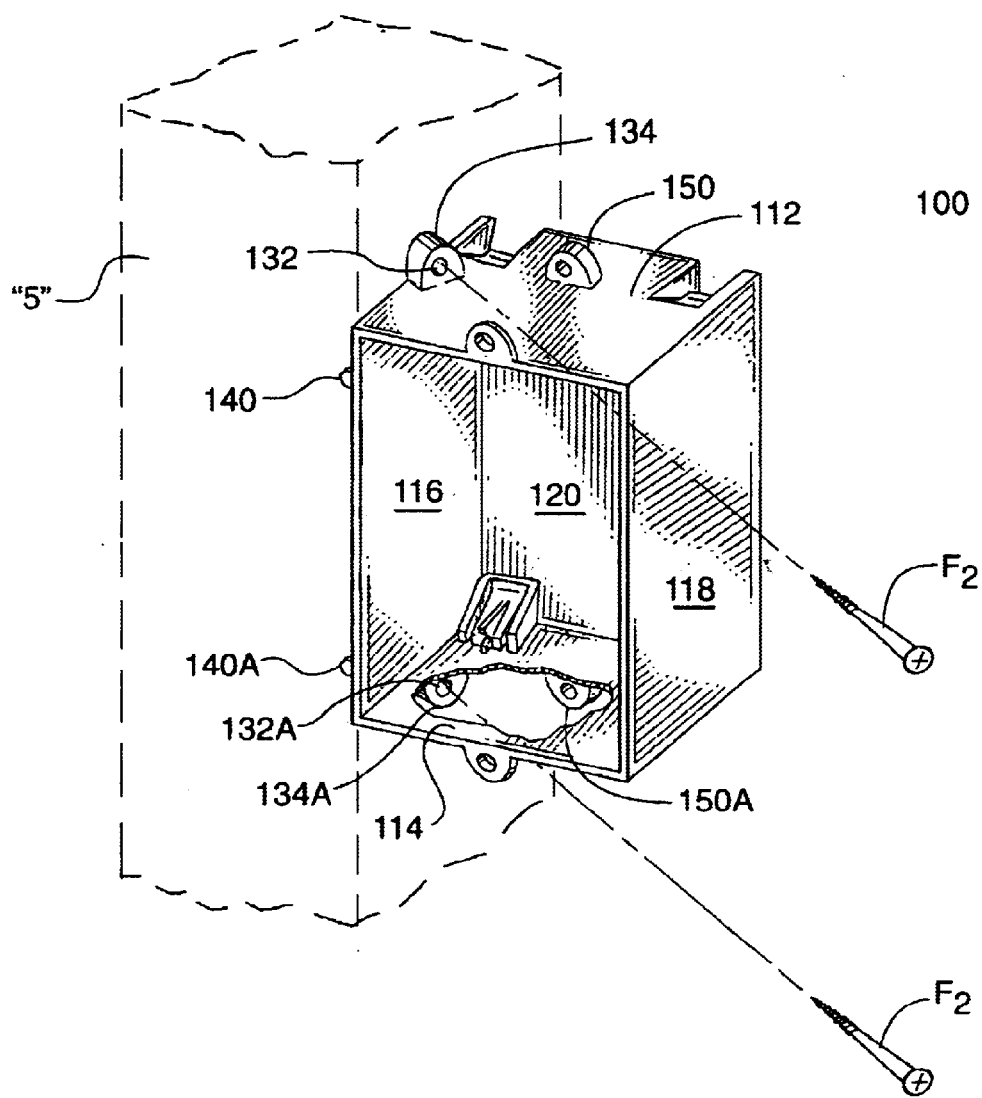
FIG. 2 is a perspective view showing an alternate embodiment of an electrical box according to the present invention installed against the surface of a structural member such as a wall stud.

In FIG. 2, an alternate embodiment of the invention is shown. In FIG. 2, the embodiment is generally designated by the numeral 100 and, again, consists of a box-like structure having a top wall 112, bottom wall 114, opposite sidewalls 116, 118 and rear wall 120. Again, the electrical box 100 may be provided with any suitable knockouts or openings in the side, top and bottom walls, as is conventional for routing wires to and from the interior of the box. One side 116 of the box is provided with small projections 140, 140A which are positioned to properly locate the box with respect to a stud "S." The projections may be flush with the front of the box, or may be displaced rearwardly so as to position the front of the box in a position forward of the stud to accommodate the thickness of the wall covering such as drywall.

The top wall 112 and bottom wall 114 are both provided with mounting members 134, 134A, respectively, which are shown as semi-circular flanges positioned adjacent sidewall 116. The mounting members are angularly disposed, each defining a bore 132, 132A respectively. The bores have an axis which extends along the dotted line. These axes intercept the plane of the front surface of the box at a location intermediate the sidewalls 116 and 118. Therefore, it can be seen that the fasteners, such as fasteners F1 and F2, can be angularly inserted through the bore in each of the mounting members from the front of the box without the necessity of having to insert them from the side of the box. In this way, the box may be installed requiring only a mounting hole which is the approximate size of the box. The fasteners can then be driven into the adjacent stud using a manual tool or a driver in the chuck of a power tool.

The electrical outlet box 100 is further provided with a pair of lugs 150, 150A extending upwardly from the top and bottom walls which are threaded to accommodate mounting screws for an electrical switch or receptacle within the box.

It will be further appreciated that the mounting box, as shown in both FIGS. 1 and 2, is reversible. Thus, the electrical box 10 of the present invention can be installed on either the left side or the right side of a mounting structural member such as stud "S." In FIGS. 1 and 2, the boxes are shown as being mounted on the right side surface of the stud "S." The box may be inverted and positioned on the lefthand side of the stud in the manner described above.

It will be appreciated once electrical boxes, according to the present invention, are installed, fasteners, such as metal fasteners F1 and F2, are located on the exterior of the box and not within the interior so that they are not in a position to likely come into contact with conductors within the box which may create a ground and a safety hazard. This is in compliance with the applicable sections of the NEC.

Figure 4:
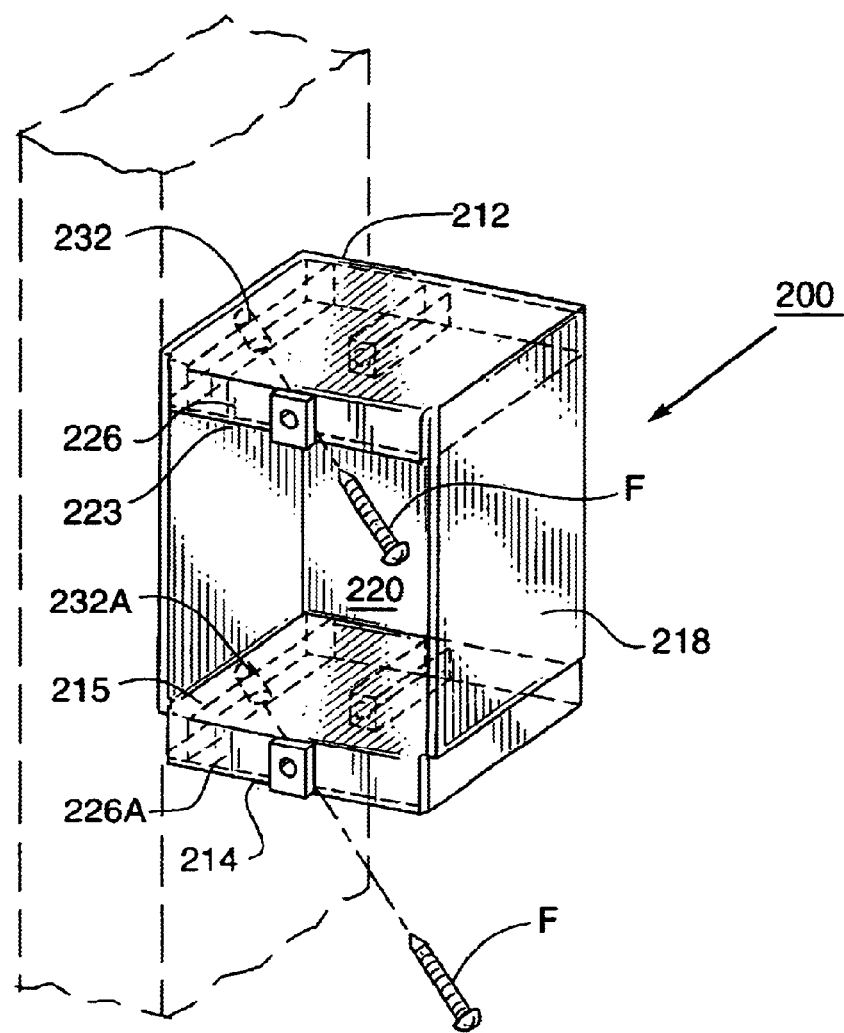
FIG. 4 is a perspective view of another embodiment of the electrical box.

FIG. 4 illustrates another embodiment similar to those shown in FIGS. 1 and 2 generally designated by the numeral 200. The box, again, has sidewalls 216, 218, top wall 212, bottom wall 214 and rear wall 220. A top interior wall 223 is spaced below top wall 212 forming an upper compartment 226. Similarly, a bottom interior wall 215 is spaced above bottom wall 214 establishing lower compartment 226A.

Angular bores 232, 232A extend through the sidewall 216. The bores are aligned at about 45° with respect to the sidewall and located so a fastener F may be inserted into the bore from the front as shown in FIG. 4. Generally the bores 232, 232A will be located at about the center of the depth dimension of the sidewall 216.

One advantage of the electrical box shown in the embodiment of FIG. 4 is that an enclosed space exists around the fasteners, eliminating gaps between the box and the drywall. The installation may be slightly more difficult requiring more precision in inserting and securing the fasteners F in place.

Figure 5:
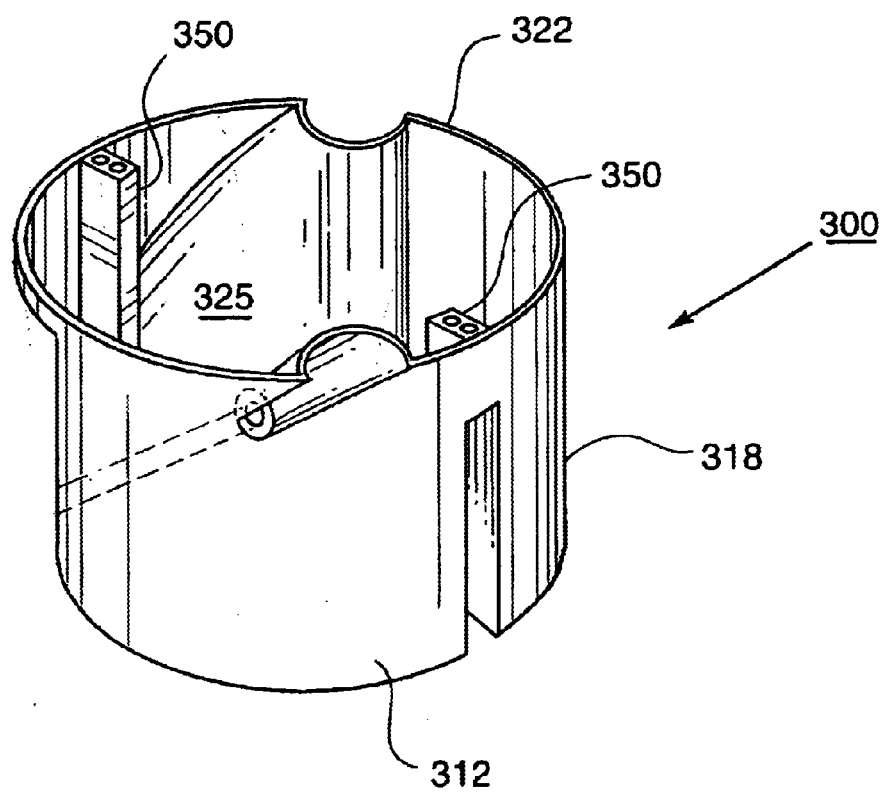
FIG. 5 is a perspective view of yet another embodiment of the electrical box according to the invention which is circular.
Figure 6:
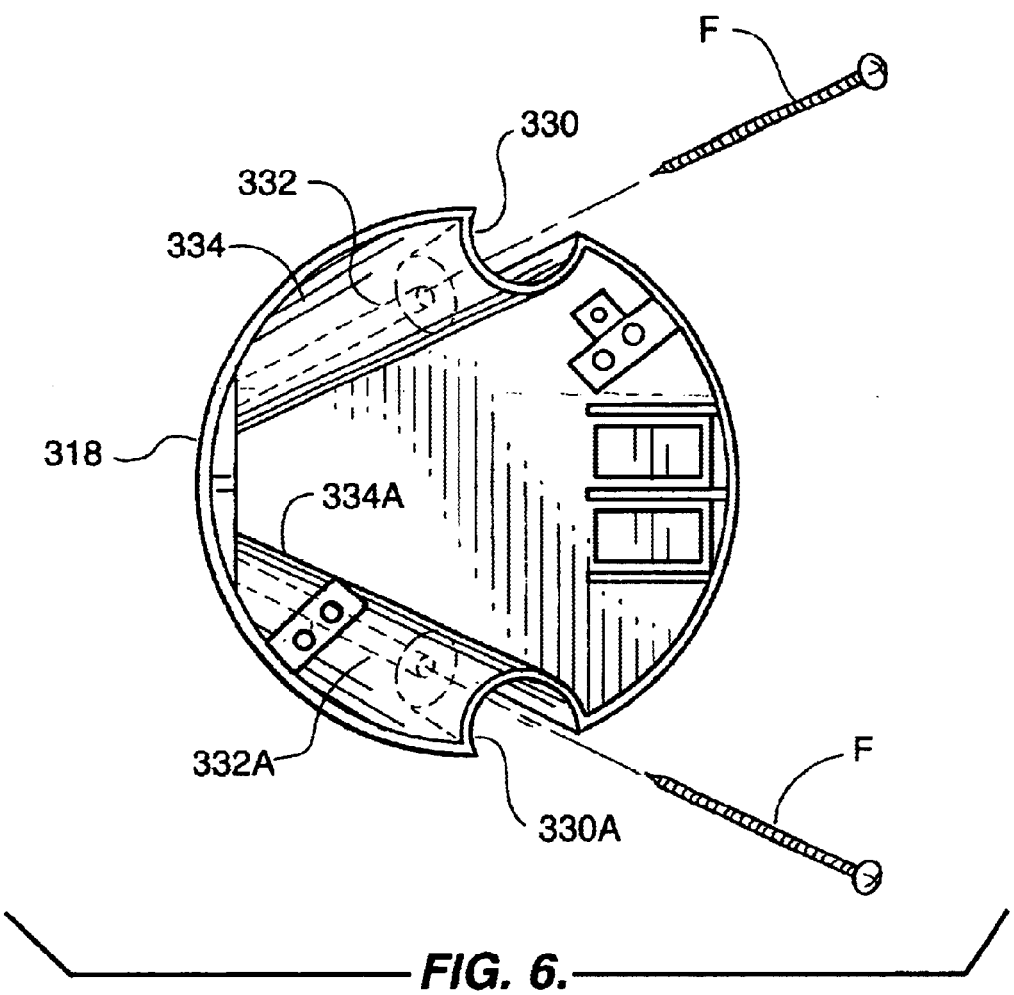
FIG. 6 is a front view of the electrical box of FIG. 5.
Figure 7:
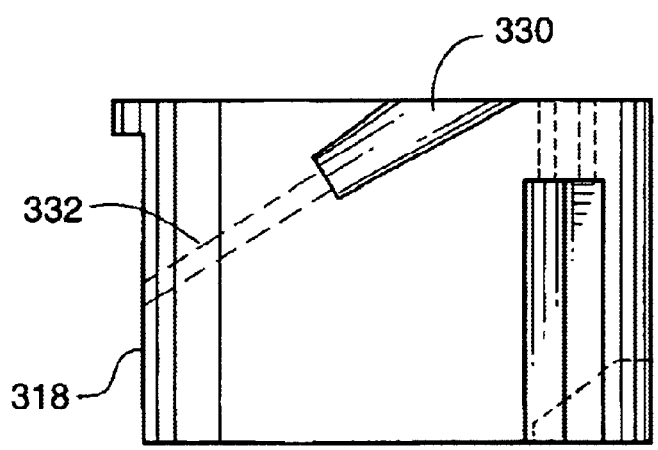
FIG. 7 is a top view of the electrical box of FIG. 5.

Referring to FIGS. 5 to 7, yet another embodiment of the electrical box generally designated by the numeral 300 is shown. The box 300 has a circular sidewall 312 having a planar or flattened section 318. A circular rim 322 extends around the front of the box. An interior enclosure 325 receives the electrical components such as a switch, receptacle or wire junction as is conventional. Tabs 350 are provided for mounting a face plate.

A first channel or recess 330 extends from the front of the box at about a 45° angle toward the planar section 318 terminating at a bore 332 in the sidewall forming a fastening member 334. Similarly, a second channel 330A is disposed generally opposite the first channel also extending angularly toward the planar section. Bore 332A is provided in the planar sidewall through fastening members on section 334A.

It will be appreciated that fasteners F can be positioned in the channels and secured to a stud or structural member to install the box 300. The flat section 318 will be positioned abutting the stud or structural member. The fasteners F are located exteriorly of the enclosure in compliance with applicable codes.

The channels 330, 330A may be open or enclosed by the sidewall although most installers will prefer an open channel for ease of installation.

It will be appreciated that preferred embodiments of the invention have been illustrated and described and will be appreciated by those skilled in the art that various changes, alterations and modifications can be made to the preferred embodiments as illustratively depicted herein without departing from the spirit and scope of the appended claims.

We claim:

1. An electrical box for affixation to an adjacent framing member comprising:
   (a) a generally rectangular housing having a top wall, bottom wall, opposite side walls and a rear defining an enclosure having an open front; and
   (b) a mounting member defining a recessed bore in each of said top and bottom walls having an axis extending angularly from one side wall to the front of the housing and including a channel in said top and bottom walls aligned with the axis of said bores, each of said channel extends between the sidewalls whereby the box may be secured by installing a fastener through the mounting means from the front of the box to the adjacent framing member.

2. The box of claim 1 wherein the box is molded from plastic.

3. The box of claim 1 wherein said box is generally rectangular having top, bottom, side and rear walls.

4. The box of claim 3 further including positioning projections on at least one sidewall.

5. The box of claim 3 wherein said mounting member comprises a flange projecting from the top and bottom walls.

6. The box of claim 3 wherein said box is circular.

7. The box of claim 1 wherein said box is metal.

8. The box of claim 1 wherein said mounting member is located in an enclosure separate from said electrical component enclosure.

9. A method of installing an electrical box in a wall having framing members and a covering comprising:
   (a) providing a box having top, bottom, side and rear walls and having a height, width and depth, said box having mounting means on one of said top or bottom walls having a bore and a guide channel that extends angularly to intercept the plane defined by the front face of the walls at a location between the sidewalls;
   (b) cutting an opening in said wall covering only slightly larger than the height and width of the box;
   (c) positioning the box adjacent a structural member;
   (d) inserting a fastener through said bores from the front face into said structural member; and
   (e) securing said fastener from the front face of the box through the opening.

10. An electrical box for affixation to an adjacent framing member comprising:
   (a) a generally rectangular housing having a top wall, bottom wall, opposite side walls and a rear wall defining an enclosure having an open front; and
   (b) a mounting member on at least one of said top and bottom walls for securing said box to an adjacent structural member, said mounting member being located on at least one of said top or bottom walls adjacent one of the sidewalls and having a bore and a guide channel to receive a fastener, said bore and channel extending at an angle with respect to the adjacent side and having an axis extending to intercept the plane defined by the front of the housing between the sidewalls.

* * * * *